United States Patent [19]
Wickes et al.

[11] Patent Number: 5,620,717
[45] Date of Patent: Apr. 15, 1997

[54] APPARATUS FOR MAKING PLASTIC MOLDS

[75] Inventors: George L. Wickes, Rochester; Kenneth L. Opdyke, Fairport; William J. Appleton; Jeffrey M. Vandewinckel, both of Rochester, all of N.Y.

[73] Assignee: Bausch & Lomb Incorporated, Rochester, N.Y.

[21] Appl. No.: 681,686

[22] Filed: Jul. 29, 1996

Related U.S. Application Data

[60] Continuation of Ser. No. 440,395, May 12, 1995, abandoned, which is a division of Ser. No. 185,296, Jan. 24, 1994, Pat. No. 5,456,864, which is a continuation of Ser. No. 953,425, Sep. 29, 1992, abandoned.

[51] Int. Cl.$^6$ ................................................... B29D 11/00
[52] U.S. Cl. .......................... 425/175; 249/134; 425/542; 425/808
[58] Field of Search .................................. 249/117, 134; 425/175, 542, 808

[56] References Cited

U.S. PATENT DOCUMENTS

| | | | |
|---|---|---|---|
| 2,129,304 | 9/1938 | Feinbloom | 88/54 |
| 3,211,811 | 10/1965 | Lanman | 264/1 |
| 3,422,168 | 1/1969 | Bowser | 264/1 |
| 3,423,488 | 1/1969 | Bowser | 264/1 |
| 3,428,533 | 2/1969 | Pichel | 204/7 |
| 3,806,079 | 4/1974 | Beattie | 249/126 |
| 3,830,460 | 8/1974 | Beattie | 249/134 |
| 3,931,373 | 1/1976 | Beattie | 264/1 |
| 4,121,896 | 10/1978 | Shepherd | 425/412 |
| 4,179,484 | 12/1979 | Neefe | 264/1 |
| 4,188,353 | 2/1980 | Neefe | 264/1 |
| 4,208,364 | 6/1980 | Shepherd | 264/1 |
| 4,284,591 | 8/1981 | Neefe | 264/1.1 |
| 4,307,046 | 12/1981 | Neefe | 264/1.4 |
| 4,457,880 | 7/1984 | Neefe | 264/1.4 |
| 4,605,524 | 8/1986 | Danker | 264/2.5 |
| 4,680,998 | 7/1987 | Council, Jr. | 82/1 |
| 4,681,295 | 7/1987 | Haardt et al. | 249/135 |
| 4,865,779 | 9/1989 | Ihn et al. | 264/1.1 |
| 5,061,342 | 10/1991 | Jones | 156/643 |
| 5,110,278 | 5/1992 | Tait et al. | 425/175 |
| 5,141,678 | 8/1992 | Blum | 264/1.7 |
| 5,200,121 | 4/1993 | Hagmann et al. | 264/1.8 |

FOREIGN PATENT DOCUMENTS

| | | |
|---|---|---|
| 0458734 | 4/1991 | European Pat. Off. |
| 89/11966 | 12/1989 | WIPO |
| 92/06833 | 4/1992 | WIPO |

*Primary Examiner*—James P. Mackey
*Attorney, Agent, or Firm*—John E. Thomas

[57] ABSTRACT

An improved method for forming plastic molds for casting articles having an optical surface such as contact lenses employs a plastic tool having an optically smooth surface.

9 Claims, 3 Drawing Sheets

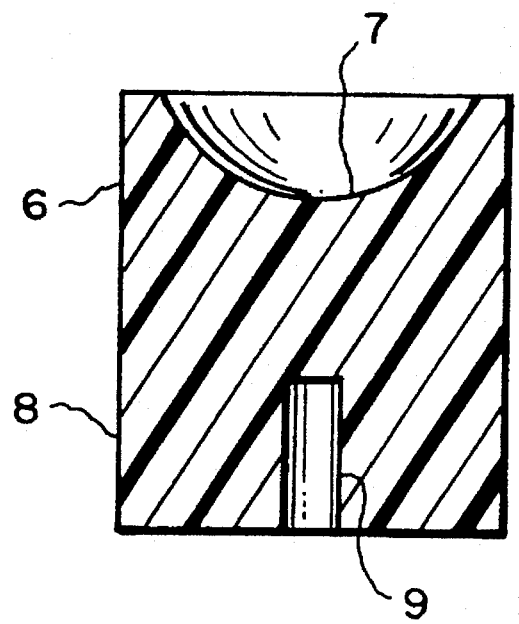
FIG. 4
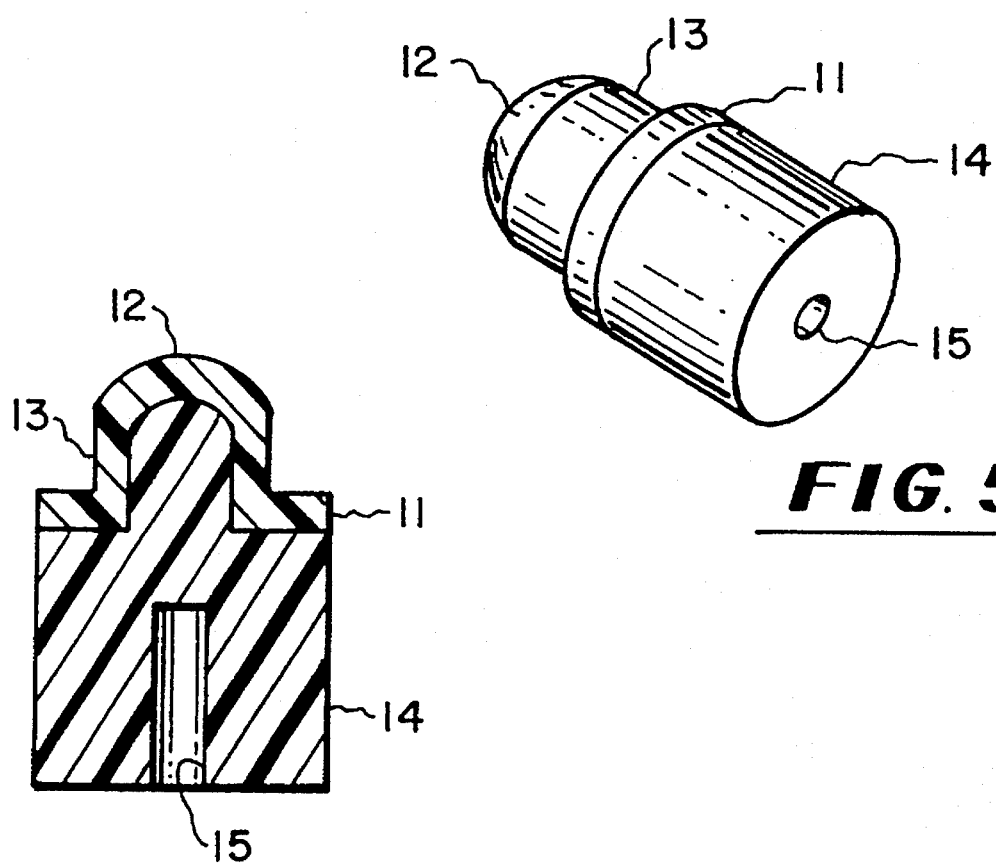
FIG. 5
FIG. 6

APPARATUS FOR MAKING PLASTIC MOLDS

This is a continuation of application Ser. No. 08/440,395 filed on May 12, 1995 (now abandoned), which is a divisional of prior application Ser. No. 08/185,296 filed on Jan. 24, 1994 (now U.S. Pat. No. 5,456,864) which is a continuation of Ser. No. 07/953,425 filed Sep. 29, 1992 (now abandoned).

BACKGROUND OF THE INVENTION

1. Field of the Invention

The present invention relates to methods of making molds in which articles having an optical surface, such as contact lenses, are formed.

2. Description of the Related Art

Various methods which are known for the production of molded articles having an optical surface, such as contact lenses, involve forming the articles in reproducible plastic molds.

U.S. Pat. Nos. 4,121,896 and 4,208,364 (Shepherd) disclose a static cast molding method for the production of contact lenses. The molds, in which the contact lenses are cast, comprise a thermoplastic male mold portion having a first molding surface to form one of the contact lens surfaces, and a thermoplastic female mold portion having a second molding surface to form the other contact lens surface. A plurality of each of the thermoplastic male and female mold portions are produced from a set of metal master molds which are fabricated by traditional machining and polishing operations.

U.S. Pat. No. 4,681,295 (Haardt et al.) discloses a tricurve optical metal master mold. The tricurve metal master mold, in conjunction with a base curve metal master, are used to prepare thermoplastic replica molds by conventional injection molding techniques, with reference to the above-identified Shepherd patents. The thermoplastic replica molds are used to static cast contact lenses having the desired tricurve configuration at the convex lens surface and the desired base curve at the concave lens surface. According to the disclosure, machining of the tricurve metal master is an exacting, complicated, precise and permanent operation, and subsequent polishing of the tricurve metal mold blank is also an operation that requires care and precision.

U.S. Pat. No. 4,865,779 (Ihn et al.) discloses a mold for the manufacture of lenses which has an anterior molding part and a posterior molding part each of which has a molding surface for forming one of the optical surfaces of the lens. The tools used to make the molds generally comprise an anterior tool and a posterior tool, each comprising an optical insert. The reference discloses that known machining and polishing operations may be used to manufacture the tools, and the tools may be fabricated from various metals.

U.S. Pat. No. 4,605,524 (Danker) discloses a method of casting a bifocal contact lens. Metallic master dies are machined to the curved surfaces necessary for the lens, and plastic casting dies, in which the contact lens is cast, are made from these metallic master dies. The master die for the anterior surface of the lens has an insert or plug of steel. The reference discloses that precision machining is generally necessary for the surfaces of the carrier and the plug which fit together, as well as for the curved surfaces corresponding to the prescription for near vision.

U.S. Pat. Nos. 4,179,484, 4,188,353 and 4,307,046 (Neefe) disclose methods of making lenses employing a single mold having an optical surface. In the '484 patent, a lens mold made of a resinous material is formed from a master mold, so as to form a resinous mold having a cup-like cavity with a curved convex surface. Subsequently, the mold is processed so as to distort the curved surface to a toric shape. A liquid monomer material is cast in the mold to produce an article having a toric concave lens surface. The convex lens surface is then cut from the hardened lens material.

In the '046 patent, a lens mold made of a resinous material is formed from a master mold, similar to the '484 patent, to form a resinous mold having a cup-like cavity with a curved convex surface, and a liquid monomer material is cast in the mold to produce an article having a concave lens surface. The convex lens surface is then cut from the hardened lens material, and the patent discloses that a carbon dioxide laser may be used to cut this optical surface.

In the '353 patent, a lens mold made of a resinous material is formed from a master mold, similar to the '484 patent, to from a resinous mold having a cup-like cavity with a curved convex surface. Subsequently, the mold is processed so as to distort the curved surface to an aspheric shape, and a liquid monomer material is cast in the mold to produce an article having an aspheric concave lens surface. The convex lens surface is then cut from the hardened lens material.

In each of the above Neefe patents, the master mold is disclosed as made from glass or stainless steel or other materials which will withstand the molding temperatures. In the '484 and '046 patents, which disclose the material used for the master mold in the working embodiments, the master mold is disclosed as being made from steel.

U.S. Pat. No. 5,110,278 (Tait et al.) discloses an injection molding apparatus for producing a toric lens casting mold arbor. The mold arbor includes a hollow, cup-like top portion having a toric surface. Lens buttons having a precision toric base curve and a generally flat front surface are molded in the cup-like top portion of the mold arbor. The toric surface of the cup-like top portion is formed upon injection molding from a toric core pin which has a concave toric end surface. The patent discloses that the toric core pin is made of metal, such a stainless steel, nickel or nickel alloy, or any other suitable permanent material, and the toric surface on the toric core pin may be produced by known manufacturing procedures, including lathe machining followed by polishing, electroforming, or electro discharge machining followed by polishing. Subsequent to molding the button with the toric lens surface, the other lens surface is lathe cut from the generally flat front surface.

According to the conventional methods for the production of plastic molds, the plastic molds are formed from a metal master mold by known injection or compression molding techniques, wherein the molding surfaces of the plastic molds are formed from a metal tool. For the production of articles having an optical surface, such as contact lenses, the metal tool is provided with an optically smooth molding surface. The machining and polishing operations for providing an optically smooth surface on the metal tools can be exacting, complicated and time-intensive, especially for irregularly shaped molding surfaces, such as a molding surface corresponding to a toric contact lens surface. Further, operator errors during the machining or polishing operation may require starting anew the machining operation or even scrapping the metal tool altogether.

SUMMARY OF THE INVENTION

In one aspect, the invention relates to an improved method of making plastic molds in which articles having an optical surface such as contact lenses are formed. An optically smooth molding surface is provided on a plastic tool; the tool is used to form an optically smooth molding surface on multiple plastic molds by conventional molding techniques. According to preferred embodiments, the plastic molds are used to form a desired surface of a contact lens. As used herein, the term "optically smooth surface" connotes a molding surface which has a quality suitable for ultimately forming the optical surface of an article such as a contact lens, e.g., the produced contact lens is suitable for placement in the eye without the need to substantially machine or polish the surface formed on the lens.

Since the tool is made of a plastic resin, the methods employed to provide a desired molding surface on the tool are less labor-intensive and time-consuming than the operations employed conventionally for metal tools. This is particularly true for tools having an irregularly shaped curved molding surface, such as a molding surface for forming a toric contact lens surface, a bifocal contact lens surface or a contact lens surface having a central zone and a peripheral zone with different curvatures. Despite being made of a plastic resin, the tool of the present invention can still be used for reproducibly molding multiple molds.

In another aspect, the invention relates to an improved process for static cast molding of contact lenses which comprises molding first and second mold sections from respective first and second master molds, wherein the first mold section includes a molding surface for forming a first desired lens surface and the second mold section includes a molding surface for forming a second desired lens surface, and curing a polymerizable lens-forming mixture in a lens-shaped cavity formed between the molding surfaces of the first and second mold sections to form a contact lens. The molding surface of at least one of the first or second mold sections is formed from a plastic tool of the present invention.

This aspect of the invention provides for forming contact lens having a final desired shape without the need to lathe cut a lens blank, including contact lenses having irregularly shaped surfaces such as toric contact lenses or lenses having zones with different curvatures.

BRIEF DESCRIPTION OF THE DRAWINGS.

FIG. 4 is a sectional view of an alternate embodiment of the tool of the present invention.

FIG. 5 is a perspective view of another alternate embodiment of the tool.

FIG. 6 is a sectional view of the tool shown in FIG. 5.

DESCRIPTION OF PREFERRED EMBODIMENTS

Figure 1:
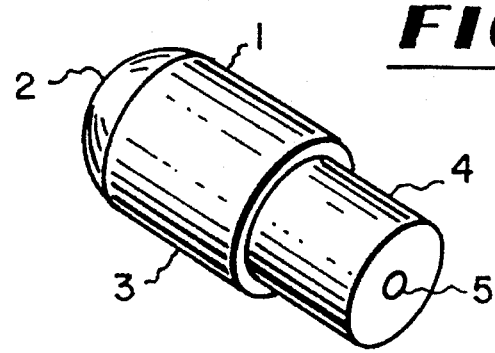
FIG. 1 is a perspective view of the tool of the present invention according to a preferred embodiment.

FIG. 1 illustrates a tool according to preferred embodiments of the present invention for making plastic contact lens molds. Tool 1 is constructed of a plastic resin and comprises optically smooth molding surface 2 as a molding portion formed on the upper end of cylindrical head 3.

For the embodiment illustrated in FIG. 1, tool 1 comprises a convex molding surface 2. Accordingly, the tool is designed to form negative concave molding surface on multiple plastic contact lens molds. In turn, contact lenses can be produced in the plastic molds by conventional methods such as spincasting, static casting, or spincasting followed by lathe cutting one lens surface, wherein the convex lens surface of the contact lenses is formed from the concave molding surface of the plastic contact lens molds.

Figure 7:
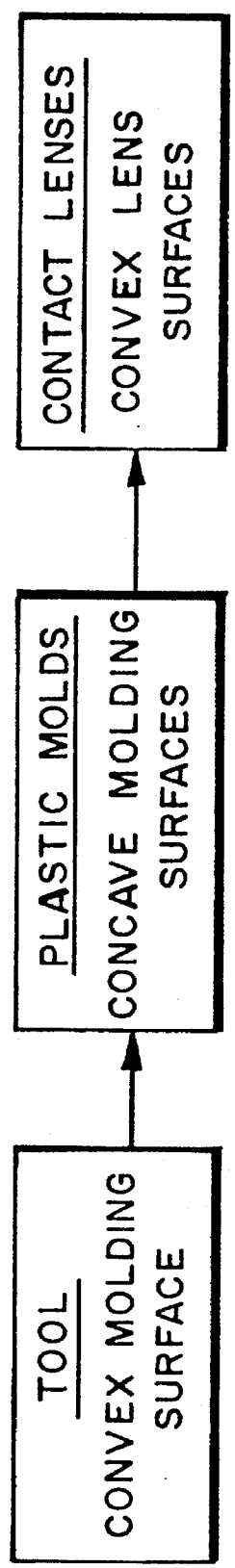
FIGS. 7 and 8 represent flow diagrams illustrating methods of the present invention.

This preferred production sequence is illustrated in FIG. 7. It will be appreciated that for this production sequence, the molding surface of the tool has a shape which substantially corresponds to a surface of the resultant contact lens. Thus, in forming a convex toric contact lens surface, the molding surface of the plastic tool would also have a convex toric shape. The term "substantially corresponds" is preferred to define this relationship between the shape of the tool molding surface and the shape of the contact lens surface since the exact shape of the contact lens surface may deviate slightly from the shape of the tool molding surface due to Such factors as shrinkage of the thermoplastic contact lens molds prior to casting contact lenses in these molds. Preferably, the molding surface of the tool also has a diameter which substantially corresponds to a diameter of the resultant contact lens surface, although the molding surface may be sized to define only a central zone of the contact lens surface.

Figure 2:
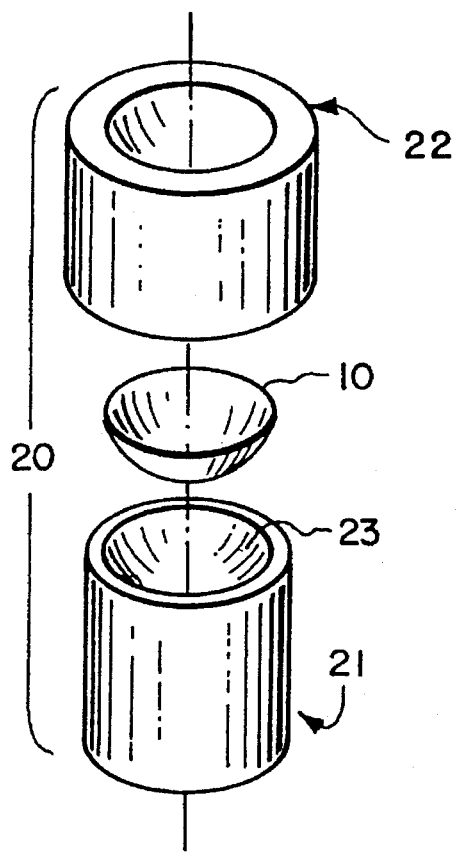
FIG. 2 is a perspective exploded view of a mold assembly and a contact lens molded therein.
Figure 3:
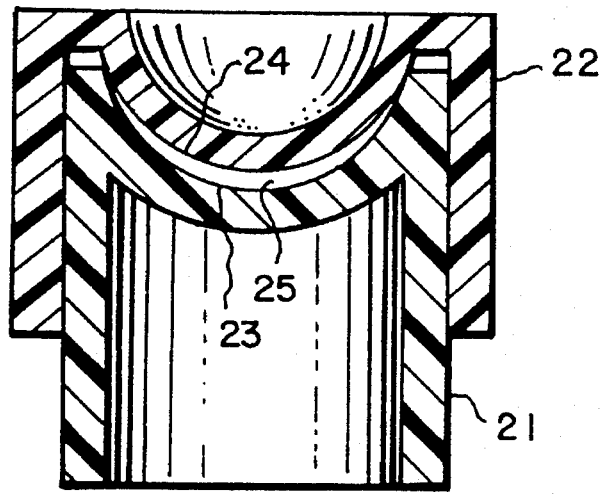
FIG. 3 is a sectional view of the assembled mold assembly shown in FIG. 2.

To further illustrate the present invention, a representative plastic mold assembly for static casting a contact lens is illustrated in FIGS. 2 and 3. Mold assembly 20 comprises generally cylindrical first mold 21 and generally cylindrical second mold 22. First mold 21 includes concave molding surface 23 and second mold 22 includes convex molding surface 24. When the mold parts are assembled as shown in FIG. 3, surfaces 23, 24 define cavity 25 in which contact lens 10 is molded. For the embodiment shown in FIG. 1, tool 1, which comprises convex molding surface 2, is suitable for the injection molding of first mold 21 wherein molding surface 2 of the tool is used to form molding surface 23 of the first mold.

The plastic contact lens molds may be molded from plastic resins known in the art, including thermoplastic resins such as polypropylene. The present method for making plastic contact lens molds differs from conventional methods in that the master mold, in which the plastic contact lens molds are formed, includes the plastic tool of the present invention; otherwise, the plastic contact lens molds are formed by methods which are known in the art. For example, tool 1 of the described preferred embodiment may be provided with cylindrical lower base 4 such that the tool takes the form of an injection molding pin, and cavity 5 is provided for mounting the tool in the injection molding apparatus used to mold the plastic contact lens mold. As a further example, the tool of the present invention may be used as an optical insert in conjunction with a mold sleeve. Any other tools constituting the master mold may be formed of metal as in conventional molding methods.

For the embodiment illustrated in FIG. 1, the tool is formed entirely of a plastic resin, in which case the tool can be lathe cut from rods of the plastic. For example, head 3 and lower base 4 can be lathed from rods of the plastic to a desired diameter to form a "blank" of the tool, i.e., the head is generally cylindrical and does not yet include the molding surface. The molding surface can then be generated on the tool. A further advantage of the present invention is that methods known for providing an optical surface to contact lens buttons can be employed to generate the desired molding surface on the tool. For example, a toric surface can be generated on surface 2 by lathe cutting, such as the method disclosed in U.S. Pat. No. 4,680,998 (Council, Jr.), the disclosure of which is incorporated herein by reference. For this process, lower base 4 of tool 1 can be mounted in a lathe chuck for the lathing operation.

As an alternate method of making tool 1, a tool-shaped article having a generally spherically curved molding portion can be injection molded. Subsequently, a desired molding surface, such as a toric surface or surface having zones of different curvature, can be generated on the tool by laser ablation. Excimer laser ablative photodecomposition (APD) techniques, in general, are known in the art, such as the APD method disclosed in U.S. Pat. No. 5,061,342 (Jones). A preferred method of generating a desired surface on the tool of the present invention is the "center-to-edge" excimer laser APD method described in commonly assigned application U.S. Ser. No. 07/953,697 (entitled "Scanning Technique for Laser Ablation", filed concurrently, attorney docket No. P01107), the disclosure of which is incorporated herein by reference. According to this method, the surface of the tool is ablated while also removing deposited and adhered debris from the surface. The method comprises the general steps of: directing a beam of pulsed UV radiation at the centerpoint of the molding surface; scanning in a direction away from the centerpoint and towards the edge of the molding surface; rotating the tool 180 degrees; returning the beam to the centerpoint of the surface; and directing the beam in a direction away from the centerpoint to the other edge of the surface.

Figure 8:
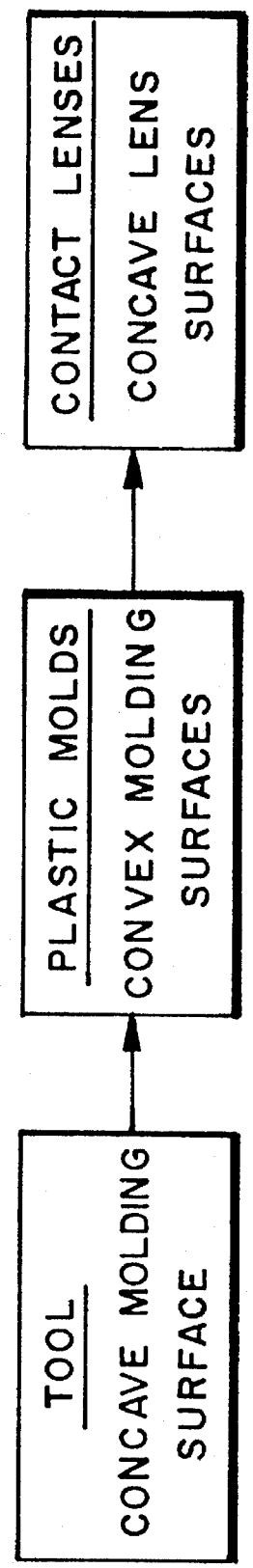

FIG. 4 illustrates an alternate embodiment wherein tool 6 comprises an optically smooth concave molding surface 7 and cylindrical base 8 which includes cavity 9. Tool 6 is constructed entirely of a plastic resin and may be incorporated in a master mold as an optical insert used in conjunction with a sleeve. Since tool 6 has a concave molding surface, this embodiment is designed to form the negative convex molding surface on multiple plastic contact lens molds, and in turn, the plastic contact lens molds form concave lens surfaces of contact lenses. As an example, tool 6 can be employed to form molding surface 24 of second mold 22 shown in FIGS. 2 and 3. A representative production sequence is illustrated in FIG. 8.

A further embodiment is illustrated in FIGS. 5 and 6. Tool 11 is formed of a plastic resin and includes molding surface 12 as a molding portion of head 13. Tool 11 has the form of an insert which nests with metal support 14. Support 14 includes cavity 15, similar in function to cavity 5 of tool 1. Tool 11 in conjunction with its support may be employed for molding processes which employ higher molding pressures. In higher pressure applications, tool 11 is less likely to deform during the molding process than a larger tool such as the embodiment shown in FIG. 1.

For this alternate embodiment, metal base 14 can be machined by known methods, and head 13 is preferably injection molded. A desired optically smooth molding surface 12 is then generated by the above-described lathing or laser ablation techniques.

In each of the above-described embodiments, the tool having the optical surface is made of an engineering plastic resin which can withstand the temperature and pressure conditions during molding of the plastic contact lens molds. For injection molding, the resin should have a heat deflection temperature of at least 350° C. and a hardness of at least 100 on the Rockwell Hardness Scale (M scale). As an additional consideration, the plastic resin must be suitable for the method employed to generate a desired surface on the plastic tool. Preferably, the resin has a hardness in the range of 100 to 125 on the M scale so that the surface of the tool can be lathed or laser ablated. While various filled resins meet the above heat and pressure criteria, generally, an optically smooth surface cannot be lathed on articles made of filled resins. Contemplated plastic resins include the following: engineering plastics based on polyetherimide resins (such as Ultem™ available from General Electric Co., Polymers Product Dept.); polyamide-imide plastics (such as Torlon available from Amoco Performance Products); polyphenylene sulfide plastics (such as Ryton™ available from Phillips Petroleum Co.); polysulfone and polyarylsulfone plastics (such as Udel™ and Radel™ available from Amoco Performance Products); polythalamide plastics (such as Amodel available from Amoco Performance Products); polyketone plastics (such as Kadel™ available from Amoco Performance Products); and various liquid crystal polymer resins (such as Xydar™ available from Amoco Performance Products). An ultem type resin is especially preferred, and a tool constructed of this plastic resin can be used for injection molding multiple polypropylene contact lens molds. Additionally, it has been demonstrated that Ultem can be lathe cut or ablated by the above-described center-to-edge excimer laser ablation technique to generate a desired optically smooth molding surface on the tool, including a toric surface.

Although preferred embodiments of the invention have been described in detail, it will be understood by those skilled in the art that variations are within the concept of the invention. For example, the tool may be provided in any overall shape suitable for forming the optical surface on the plastic molds.

We claim:

1. A tool for forming plastic molds, said tool being constructed of an engineering plastic resin that can withstand injection molding conditions and comprising a curved molding surface having an optically smooth finish as a molding portion, wherein the shape of said molding surface substantially corresponds to a desired shape of a contact lens surface.

2. The tool of claim 1, wherein the molding surface is convex.

3. The tool of claim 1, wherein the molding surface is concave.

4. The tool of claim 1, wherein the molding surface comprises a central zone having a first curvature and a peripheral zone having a second curvature different from said first curvature.

5. The tool of claim 1, wherein the molding surface is toric.

6. The tool of claim 1, wherein the tool comprises a head portion including the molding portion and a lower base portion extending from the head portion, said lower base portion including means for mounting the tool in an injection molding apparatus.

7. The tool of claim 1, wherein the tool comprises a head portion including the molding portion, said head portion adapted for receiving a cylindrical metal support.

8. The tool of claim 1, wherein the molding surface is generated on the tool by lathe cutting.

9. The tool of claim 1, wherein the molding surface is generated on the tool by laser photodecomposition ablation.

* * * * *